Dec. 5, 1950  A. F. UNDERWOOD ET AL  2,532,795
BEARING
Filed Nov. 23, 1945

Inventors
Arthur F. Underwood &
John M. Stone

Attorneys

Patented Dec. 5, 1950

2,532,795

UNITED STATES PATENT OFFICE 2,532,795

BEARING

Arthur F. Underwood, Grosse Pointe, and John M. Stone, Grosse Pointe Park, Mich., assignors to General Motors Corporation, Detroit, Mich., a corporation of Delaware Application November 23, 1945, Serial No. 630,162

4 Claims. (Cl. 308—9)

1

This invention has to do with floating bearings and mounting means therefor.

Floating bushings have been employed heretofore in numerous places. As used heretofore the floating bushing is free to turn and it is usually supposed that it is turning or should turn at half speed. In accordance with the present invention a floating bearing for a shaft subjected to a load that is continuously changing in direction as the shaft rotates is fixed against rotation while it is permitted to float. In this way the load carrying capacity of the bearing oil films are at a maximum. Compared to a floating bearing which rotates at half speed the bearing has twice the load carrying capacity of the oil film for the inner bearing surface and one-third more capacity for the outer surface. The non-rotating floating bearing also has the advantage that the outer oil film becomes a stiff, self-aligning film to allow some adjustment for shaft misalignment. Accordingly the primary object of the invention is to provide an improved assembly of floating bearing and mounting means whereby the load carrying capacities of the oil films are greatly increased as compared with constructions heretofore used and wherein adjustment is provided for shaft misalignment. Other objects and advantages of the invention will become more apparent as the description proceeds. Reference is herewith made to the accompanying drawing illustrating a construction in accordance with one embodiment of the invention.

Figure 1:
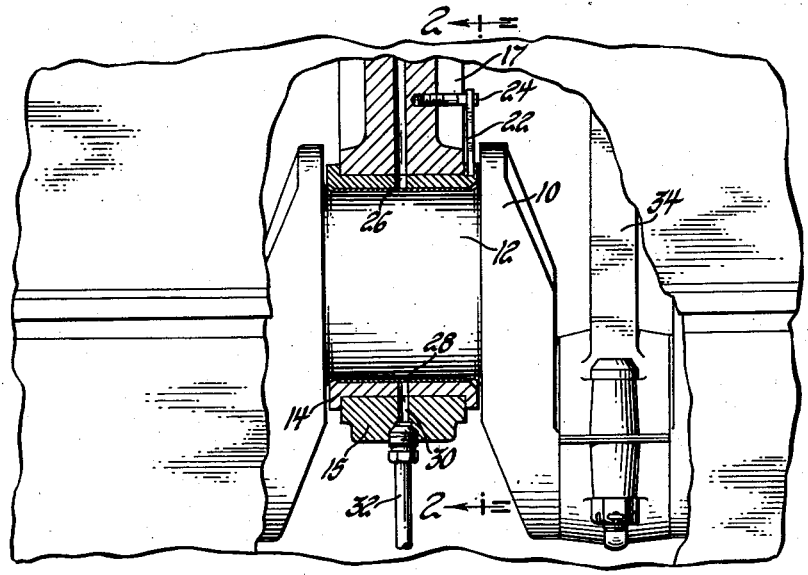
Figure 1 is an elevational view with parts in section of a portion of an internal combustion engine showing a construction in accordance with the invention.
Figure 2:
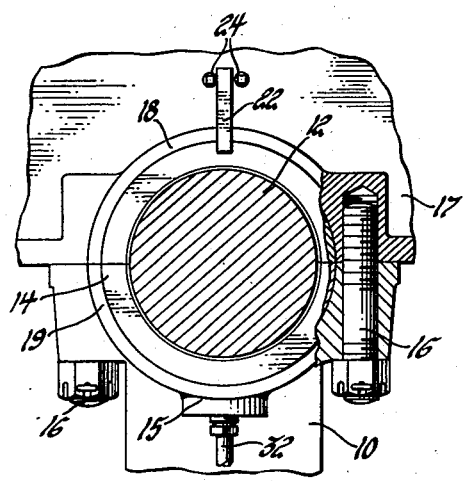
Figure 2 is a sectional view substantially on line 2—2 in Figure 1 looking in the direction of the arrows.

In the drawing, 10 indicates a crankshaft having a journal 12. Surrounding the journal is a floating bearing 14. A bearing cap 15 is secured by bolts 16 to the engine block 17. The engine block has a semi-cylindrical surface portion 18 which together with the semi-cylindrical surface portion 19 of the bearing cap surrounds the floating bearing and supports the same as will be readily understood.

A finger 22 has one end fixed to the bearing 14.

2

Two similar pins 24 are fixed to the engine block and are so spaced that the outer portion of the finger is free to move between the pair of spaced pins. The purpose of the finger and spaced pins is to hold the bearing 14 against rotation with the crankshaft while permitting the bearing to float about the journal 12 and within the bearing cap and corresponding portion of the engine block as permitted by the clearances between the several parts. The clearances may be on the same order as employed with conventional floating bearings. The bearing is shown as having oil holes 26 and 28 formed therein while the bearing cap has an oil hole 30. An oil line 32 has one end connected to the oil hole 30 and supplies oil under pressure to the clearance spaces between the journal and floating bearing and between the bearing and bearing cap and engine block. The crankshaft is shown as being rotated by the connecting rod 34.

Figure 3:
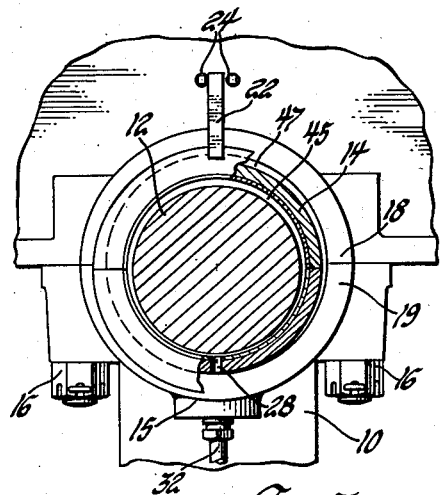
Figure 3 is a view generally similar to Figure 2 with clearances indicated in an exaggerated manner in order to show the construction and operation more clearly.

It will be understood that the loading force on the crankshaft journal is constantly changing in direction as the crankshaft rotates. This action causes the crankshaft journal to attempt to approach the inner surface of the floating bearing and the outer surface of the floating bearing to approach the external support therefor. Figure 3 illustrates in an exaggerated manner the relative position of the parts at one point in the cycle of rotation. The clearance between the journal and bearing is indicated at 45 and the clearance between the outer surface of the bearing and the bearing support is indicated at 47. Since the direction of the load is constantly changing the journal attempts to approach the inner bearing surface and the outer surface of the floating bearing attempts to approach the external support at different circumferential areas during each rotation of the shaft. This action squeezes a part of the oil film out during each revolution and it is necessary to replenish the oil in the unloaded clearances before the load has made a complete circle. The oil film 47 between the outer surface of the bearing and the bearing support is not produced by relative velocity between the two surfaces as is developed in a regular rotating bearing and may be termed "squeeze film" to so distinguish it. This film is frictionless or substantially so since the film is not produced by shearing of the oil film.

The desirable characteristics of the described construction will be apparent from the formula given below. The formula gives the load carrying capacity of a journal bearing lubricated by an oil film and operating under conditions in which the journal rotates with uniform angular velocity with respect to the bearing shell, herein designated as Journal R. P. M., while the journal is acted upon by a loading force whose direction rotates with uniform angular velocity with respect to the bearing shell herein designated as Load R. P. M. The Journal R. P. M. and the Load R. P. M. are regarded positive when the journal and the load are rotating in one arbitrarily selected direction with respect to the bearing shell and are regarded as negative when the rotations are in the opposite direction. The formula then states that the load carrying capacity of the oil film of the bearing, herein abbreviated to L. C. C., which is the magnitude of the load required to produce a given eccentricity, is:

L. C. C.$=K(2\times$Load R. P. M.$-$Journal R. P. M.) in which $K$ is a numeral constant, the value of which depends only on the dimensions of the bearing and shaft and on the eccentricity and oil viscosity.

We claim:

1. A rotating shaft, means for applying force to the rotating shaft constantly changing in circumferential direction as the shaft rotates, a floating bearing for said shaft, a stationary support for said floating bearing, cooperating members carried by said bearing and stationary support for holding said floating bearing against rotation with said shaft while allowing the bearing to float in said stationary support and means for supplying oil while the shaft is rotating to the clearance space between the floating bearing and support and to the clearance space between the shaft and floating bearing.

2. A crankshaft, means for rotating and applying force to the crankshaft constantly changing in a circumferential direction as the crankshaft rotates, a floating main bearing for said crankshaft, a stationary support for said floating bearing, cooperating members carried by said floating bearing and stationary support for holding said floating bearing from rotating with said crankshaft while allowing the same to float and means for supplying oil under pressure as the crankshaft rotates to the clearance space between the floating bearing and support and to the clearance space between the crankshaft journal and floating bearing.

3. A rotating crankshaft, a floating main bearing for said crankshaft, a stationary support for the floating bearing, an arm or finger fixed to the floating bearing, spaced pins on the stationary support cooperating with the arm to prevent rotation of the bearing while permitting the bearing to float and means for supplying oil under pressure as the crankshaft rotates to the clearance space between the floating bearing and support and to the clearance space between the crankshaft journal and floating bearing.

4. A crankshaft, means for rotating and applying force to the crankshaft constantly changing in a circumferential direction as the crankshaft rotates, a floating main bearing for said crankshaft, a stationary support for the floating main bearing, a finger fixed to the floating main bearing, means carried by the stationary support for engaging the finger to prevent rotation of the main bearing while permitting the main bearing to float in said stationary support and means for supplying oil under pressure as the crankshaft rotates to the clearance space between the floating main bearing and its support and to the clearance space between the crankshaft journal and floating main bearing.

ARTHUR F. UNDERWOOD.
JOHN M. STONE.

REFERENCES CITED

The following references are of record in the file of this patent:

UNITED STATES PATENTS

| Number | Name | Date |
|---|---|---|
| 785,036 | Farewell | Mar. 14, 1905 |
| 1,499,332 | Baumann | July 1, 1924 |

FOREIGN PATENTS

| Number | Country | Date |
|---|---|---|
| 211,645 | Germany | July 8, 1909 |